United States Patent
McCormack (10) Patent No.: US 6,754,331 B2
(45) Date of Patent: Jun. 22, 2004

(54) DETERMINING STATISTICS ABOUT THE BEHAVIOR OF A CALL CENTER AT A PAST TIME INSTANT

(75) Inventor: Tony McCormack, Galway (IE)

(73) Assignee: Nortel Networks Limited, St. Laurent (CA)

(*) Notice: Subject to any disclaimer, the term of this patent is extended or adjusted under 35 U.S.C. 154(b) by 13 days.

(21) Appl. No.: 10/247,171

(22) Filed: Sep. 19, 2002

(65) Prior Publication Data

US 2004/0057416 A1 Mar. 25, 2004

(51) Int. Cl.[7] .................................. H04M 3/00
(52) U.S. Cl. ........................ 379/265.03; 379/265.06
(58) Field of Search ................ 379/265.03, 265.06, 379/309

(56) References Cited

U.S. PATENT DOCUMENTS 5,623,540 A * 4/1997 Morrison et al. ...... 379/112.01
5,911,134 A * 6/1999 Castonguay et al. ........... 705/9

* cited by examiner

Primary Examiner—Creighton Smith
(74) Attorney, Agent, or Firm—Barnes & Thornburg (57) ABSTRACT

Call center supervisors require information about the performance of call center agents in order to manage them appropriately. Previously this information has been provided in two general forms. Current information in the form of statistics such as queue lengths, numbers of active agents, etc. and historical information in the form of aggregate data such as the average waiting time over a 15 minute period. At present supervisors have no means of accessing information about the state of a call center at a particular past time instant. The present invention provides this information by using a pegging engine to extrapolate from statistics about behavior of the call center at a past time instant to values of those statistics at a required past time instant. Information about events occurring in the call center is used in order to carry out this extrapolation.

16 Claims, 8 Drawing Sheets

Agent Performance By Supervisor

Site Name: Anywhere

Table Name: iAgentPerformanceStat

| Answered | N/W Answd | Short Calls Answered | Rtn to Skillset Transfd | Transfd Out | Not Resrvd For Call |
|---|---|---|---|---|---|
| GRAND TOTAL | | | | | |
| 3 | 0 | 2 | 0 | 0 | 0 |
| Supervisor Name & ID: Bloggs, Joe – 2222 | | | | | |
| 3 | 0 | 2 | 0 | 0 | 0 |
| Agent Name & ID: Jane Book – 3333 | | | | | |
| 3 | 0 | 2 | 0 | 0 | 0 |

Time Averages

Not Ready Time: 00:00:00

1/7/02

| | | | | | |
|---|---|---|---|---|---|
| 1 | | 0 | 0 | 0 | 0 | 0 |
| 2 | 15:15 | 0 | 2 | 0 | 0 | 0 |

Daily 1/7/02

| 3 | 0 | 2 | 0 | 0 | 0 |
|---|---|---|---|---|---|

Time Averages

*Fig. 3* A
(PRIOR ART)

Report Interval: 15:00:00 07 January, 2002 – 15:30:00 07 January, 2002

| Rtn To Que | Que due Timeout | Logged In Time | ACD/ Resrvd Time | Ring Time | Talk Time | Waiting Time |
|---|---|---|---|---|---|---|
| 0 | 0 | 00:30:50 | 00:00:00 | 00:00:07 | 00:00:33 | 00:30:10 |
| 0 | 0 | 00:30:50 | 00:00:00 | 00:00:07 | 00:00:33 | 00:30:10 |
| 0 | 0 | 00:30:00 | 00:00:00 | 00:00:07 | 00:00:33 | 00:29:20 |

Skillset Talk Time: 00:00:11

| | | | | | | |
|---|---|---|---|---|---|---|
| 0 | 0 | 00:15:00 | 00:00:00 | 00:00:03 | 00:00:30 | 00:14:27 |
| 0 | 0 | 00:15:00 | 00:00:00 | 00:00:04 | 00:00:03 | 00:14:53 |
| 0 | 0 | 00:30:00 | 00:00:00 | 00:00:07 | 00:00:33 | 00:29:20 |

*Fig. 3* B
(PRIOR ART)

Not Ready Time: 00:00:00

| Agent | 3 | 0 | 2 | 0 | 0 | 0 |

Agent Name & ID: Kate Tree – 5555

| | 0 | 0 | 0 | 0 | 0 | 0 |

Time Averages

Not Ready Time: 00:00:00

1/7/02

| 0 | | 0 | 0 | 0 | 0 | 0 |

Daily 1/7/02

| | 0 | 0 | 0 | 0 | 0 | 0 |

Time Averages

Not Ready Time: 00:00:00

| Agent | 0 | 0 | 0 | 0 | 0 | 0 |
| Supervisor | 3 | 0 | 2 | 0 | 0 | 0 |

GRAND TOTAL

| | 3 | 0 | 2 | 0 | 0 | 0 |

Printed By : sysadmin 1/7/02 3:35:02 PM

*Fig. 3*C
(PRIOR ART)

Skillset Talk Time: 00:00:11

| | | | | | | |
|---|---|---|---|---|---|---|
| 0 | 0 | 00:30:00 | 00:00:00 | 00:00:07 | 00:00:33 | 00:29:20 |
| 0 | 0 | 00:00:50 | 00:00:00 | 00:00:00 | 00:00:00 | 00:00:50 |

Skillset Talk Time: 00:00:00

| | | | | | | |
|---|---|---|---|---|---|---|
| 0 | 0 | 00:00:50 | 00:00:00 | 00:00:00 | 00:00:00 | 00:00:50 |
| 0 | 0 | 00:00:50 | 00:00:00 | 00:00:00 | 00:00:00 | 00:00:50 |

Skillset Talk Time: 00:00:00

| | | | | | | |
|---|---|---|---|---|---|---|
| 0 | 0 | 00:00:50 | 00:00:00 | 00:00:00 | 00:00:00 | 00:00:50 |
| 0 | 0 | 00:30:50 | 00:00:00 | 00:00:07 | 00:00:33 | 00:30:10 |
| 0 | 0 | 00:30:50 | 00:00:00 | 00:00:07 | 00:00:33 | 00:30:10 |

*Fig. 3*D
(PRIOR ART)

| Skillset | Max wait time | Average answer delay | % service level | Calls answered | Calls waiting | Agents staffed | Agents active | Agents not ready | Agents idle |
|---|---|---|---|---|---|---|---|---|---|
| Sales of product A | 1 min | 3 min | 100 | 4 | 2 | 4 | 1 | 1 | 0 |
| Sales of product B | 24 min | 35 min | 28 | 99 | 30 | 33 | 18 | 6 | 0 |
| Support product A | 1.5 min | 40 min | 18 | 11 | 6 | 7 | 4 | 0 | 0 |
| Support product B | 0.5 min | 19 min | 66 | 3 | 3 | 9 | 0 | 2 | 0 |
| Account queries | 0 | 0 | 0 | 0 | 0 | 9 | 0 | 2 | 0 |
| Upgrade request product A | 0 | 5 min | 100 | 7 | 6 | 0 | 1 | 0 | 0 |
| Upgrade request product B | 2 min | 26 min | 50 | 2 | 3 | 2 | 0 | 0 | 0 |

DETERMINING STATISTICS ABOUT THE BEHAVIOR OF A CALL CENTER AT A PAST TIME INSTANT

FIELD OF THE INVENTION

The present invention relates to a method and apparatus for determining statistics about the behaviour of a call center at a required past time instant.

BACKGROUND TO THE INVENTION

Call centers are known in which incoming calls are routed to one of a plurality of agents. For example, the call center might provide help desk facilities for a particular group of products and customers who are able to call in and be allocated to an agent who has the necessary skills to deal with his or her query. Each agent has one or more skills, for example, a particular agent has knowledge about sales for product X and about technical support for product Y. An incoming call is received and information from that call used by the call center, together with information about the agents, in order to route the incoming call to an agent with the appropriate skill. For example, an interactive voice response system (IVR system) may be used to find out what type of agent skill is required. Associated with each skill is a queue into which incoming calls are placed until an agent with that skill becomes available.

The term "call center" as used herein is not intended to be restricted to situations in which telephone calls are made to the center. Other types of call or contact are also envisaged, such as email, fax, SMS, chat, web access and any other suitable method of contact including conventional telephone calls and voice over internet protocol telephone calls. Similarly, the term "call" as used herein is not intended to be restricted to conventional telephone calls but includes contacts made by email, fax, voice over IP and any other suitable medium.

Typically a call center has many agents, for example, from less than 10 to 1500 or more. Those agents are grouped into teams each team having a supervisor responsible for managing those agents. For example, there might be about 30 agents in a team managed by one supervisor.

Supervisors require information about the performance of the agents and the queues associated with their skills in order to manage them appropriately. Previously this information has been provided in two general forms. Current information in the form of statistics such as queue lengths, numbers of active agents, numbers of idle agents etc. and historical information in the form of aggregate data such as the average waiting time over a 15 minute period or the total number of incoming calls over a 15 minute period. The current information is typically presented to the supervisors at a client machine "real-time display" operated by that supervisor and is refreshed every 5 seconds for example. The historical data can be accessed by the supervisors from their client machines by requesting that an historical report be generated.

Often service level agreements are entered into with particular enterprises whereby the call center provider agrees to ensure specified maximum waiting times for calls of particular specified types for example. Supervisors require the information mentioned above in order to assist in ensuring that service level agreements are met and to make the most efficient use of the call center resources. For example, as a result of analysing the information supervisors can take action such as allocating more agents to a particular skill or sending particular agents for training.

Situations often arise however, in which supervisors need to analyse behaviour in the call center at a particular time instant in the past. For example, if a customer complaint is received about a particular past event. At present however supervisors have no means of accessing information about the state of a call center at a particular time instant in the past. The historical reports only provide aggregate data over a time period such as 15 minutes and the granularity of information as available on the supervisor's real-time display is not available for the past time instant. For example, a supervisor is unable to identify from an historical report what a particular agent was doing at a past time instant o how long he spent on a particular call, except by resorting to a highly complex manual task of analysing call events from the time instant in the past An object of the present invention is therefore to provide a method of determining statistics about the behaviour of a call center at a required past time instant which overcomes or at least mitigates one or more of the problems mentioned above.

Further benefits and advantages of the invention will become apparent from a consideration of the following detailed description given with reference to the accompanying drawings, which specify and show preferred embodiments of the invention.

SUMMARY OF THE INVENTION

According to an aspect of the present invention there is provided a method of determining statistics about the behaviour of a call center at a required past time instant said method comprising the steps of:

- storing sets of values of statistics about the behaviour of the call center at a plurality of time intervals, each set of values being associated with a particular time instant;
- accessing information about past events occurring in the call center from an event database;
- accessing from said stored sets of values, a first set of values whose associated time instant is a known time from said required past time instant;
- extrapolating from said first set of values to an output set of values whose associated time instant is the required time instant, by using information accessed from the event database.

This provides the advantage that a quick and simple method of obtaining statistics about the behaviour of the call center at a past time instant is available. Sets of values of these statistics are stored at intervals, each set of values reflecting what was the "current" behaviour of the call center at a particular time. These intervals may be for example every half an hour or longer. In this way, the number of such sets of values to be stored is not prohibitive whilst at the same time it is still possible to extrapolate from those stored sets to a particular time instant.

In a preferred embodiment said step of extrapolating comprises:

- initialising a pegging engine using said accessed set of values,
- accessing from the event database information about events occurring between the time instant associated with the first set of values and the required time instant; and
- processing the accessed information about events using the initialised pegging engine in order to produce an output set of values of statistics whose associated time instant is the required time instant.

This provides a simple and effective way in which the extrapolation process is carried out. The pegging engine only needs to process those events occurring between the times mentioned above and this speeds up the process.

Preferably the method further comprises sending said output set of values to a supervisor terminal associated with the call center for display to a supervisor. This enables a supervisor to quickly and easily view information about the performance of the call center at a particular past time. This is helpful for analysing problems that occurred at a particular time or for dealing with customer complaints and other issues.

In one embodiment the output set of values are for the same statistics as also displayed to a supervisor about the current behaviour of the call center. This provides a user friendly way in which the information is provided to the supervisor. For example, the supervisor is used to viewing particular statistics about the current call center behaviour on his or her display screen. The supervisor is now able to view those same statistics but for a past time instant.

Preferably said first set of values is associated with a time instant prior to the required time instant. In this situation the extrapolation process involves working forwards from the first set of values to the required time instant. This is advantageous because a pegging engine can be used for the extrapolation process where that pegging engine operates in the same manner as a pegging engine already provided in a call center server itself as known in the art.

According to another aspect of the invention there is provided an apparatus for determining statistics about the behaviour of a call center at a required past time instant said apparatus comprising:

- a storage device arranged to store sets of values of statistics about the behaviour of the call center at a plurality of time intervals, each set of values being associated with a particular time instant;
- a first input arranged to access information about past events occurring in the call center from an event database;
- a second input arranged to access from said stored sets of values, a first set of values whose associated time instant is a known time from said required past time instant; and
- a processor arranged to extrapolate from said first set of values to an output set of values whose associated time instant is the required time instant, by using information accessed from the event database The invention also encompasses a call center comprising an apparatus as described above.

In addition, the invention encompasses a computer program arranged to control a call center in order to carry out the method described above.

According to another aspect of the invention there is provided a statistics regenerator for use in a call center said statistics regenerator comprising:

- a first input arranged to access stored sets of values of statistics about the behaviour of the call center each set of values being about behaviour of the call center at a past time instant;
- a second input arranged to access information about past events occurring in the call center from an event database;
- a processor arranged to use the first input to access a first set of values about behaviour of the call center at a past time instant which is a known time from said required past time instant;
- a pegging engine arranged to extrapolate from said first set of values to an output set of values whose associated time instant is the required time instant, by using information accessed from the event database.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Embodiments of the present invention are described below by way of example only. These examples represent the best ways of putting the invention into practice that are currently known to the Applicant although they are not the only ways in which this could be achieved.

Figure 1:
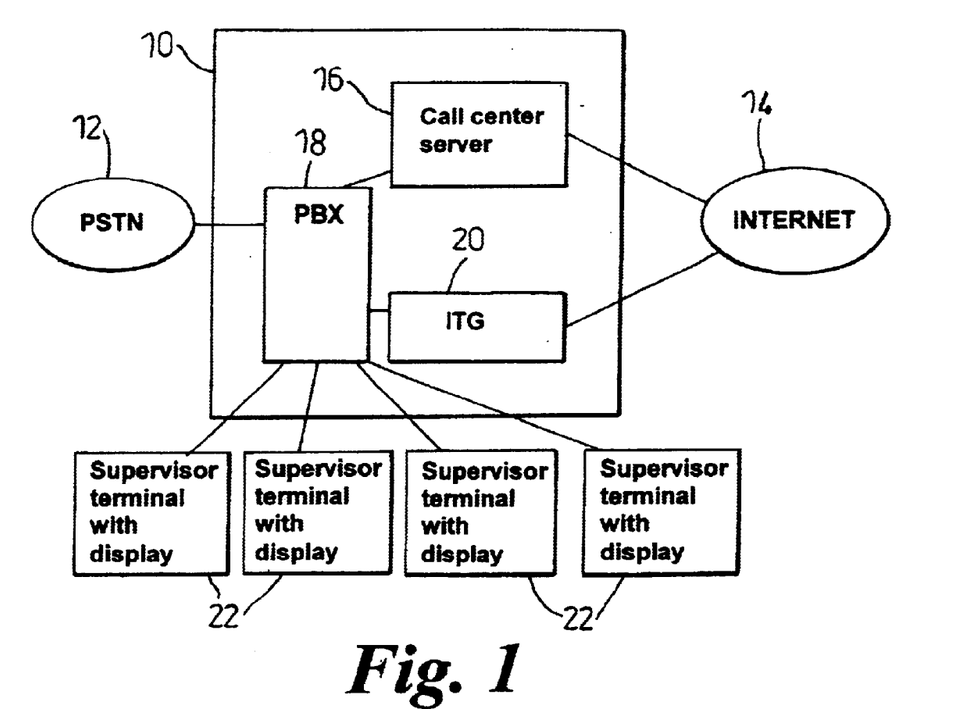
FIG. 1 is a schematic diagram of a call center arranged for the present invention.

FIG. 1 is a schematic diagram of a call center 10 suitable for use with the present invention. It comprises a private branch exchange (PBX) 18 which is connected to the public switched telephone network (PSTN) 12 in order to receive and handle calls as known in the art. A plurality of supervisor terminals 22 are connected to the call center 10 to manage call centre resources. A suitable PBX is the Meridian exchange provided by Nortel Networks (trade mark) and as known to the person skilled in the art. An internet telephony gateway (ITG) 20 connects the PBX 18 to the internet 14 and this allows the PRX to receive voice over internet protocol (VoIP) calls from the internet and allows agents to make VoIP calls.

A contact center server 16 is also provided. This oversees and manages the running of the contact center 10 by instructing the PBX to transfer calls to suitable agent terminals. The PBX and the call center server may be integral in the same physical apparatus although this is not essential. The call center server 16 also presents information to agents and manages agent queues amongst other things as known in the art.

Figure 2:
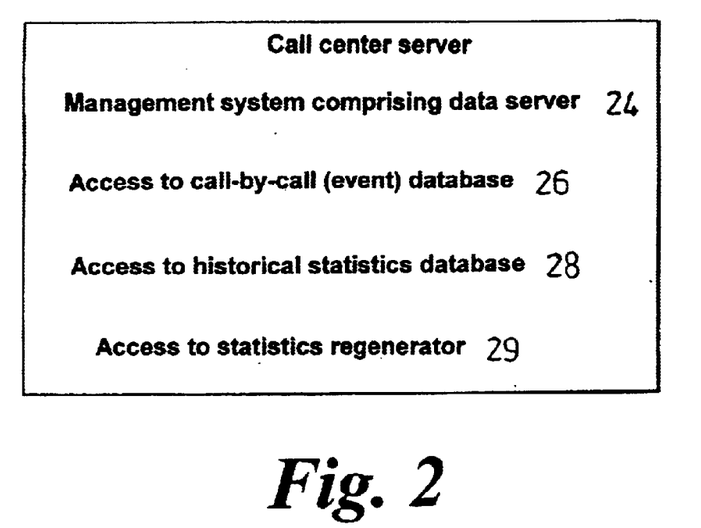
FIG. 2 is a schematic diagram of the call center server of the call center of FIG. 1.
Figure 3A:
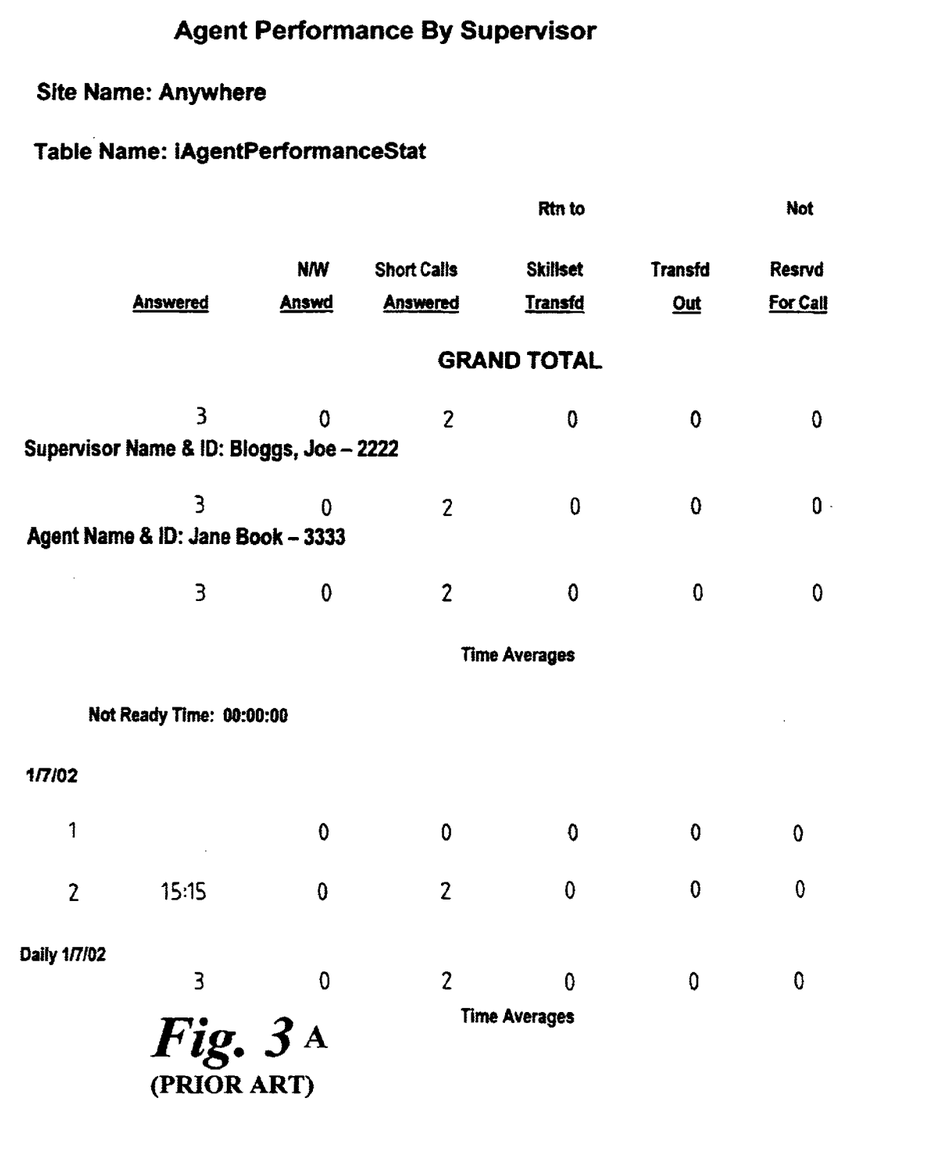
FIGS. 3A–3D are an example of an historical report according to the prior art
Figure 3B:
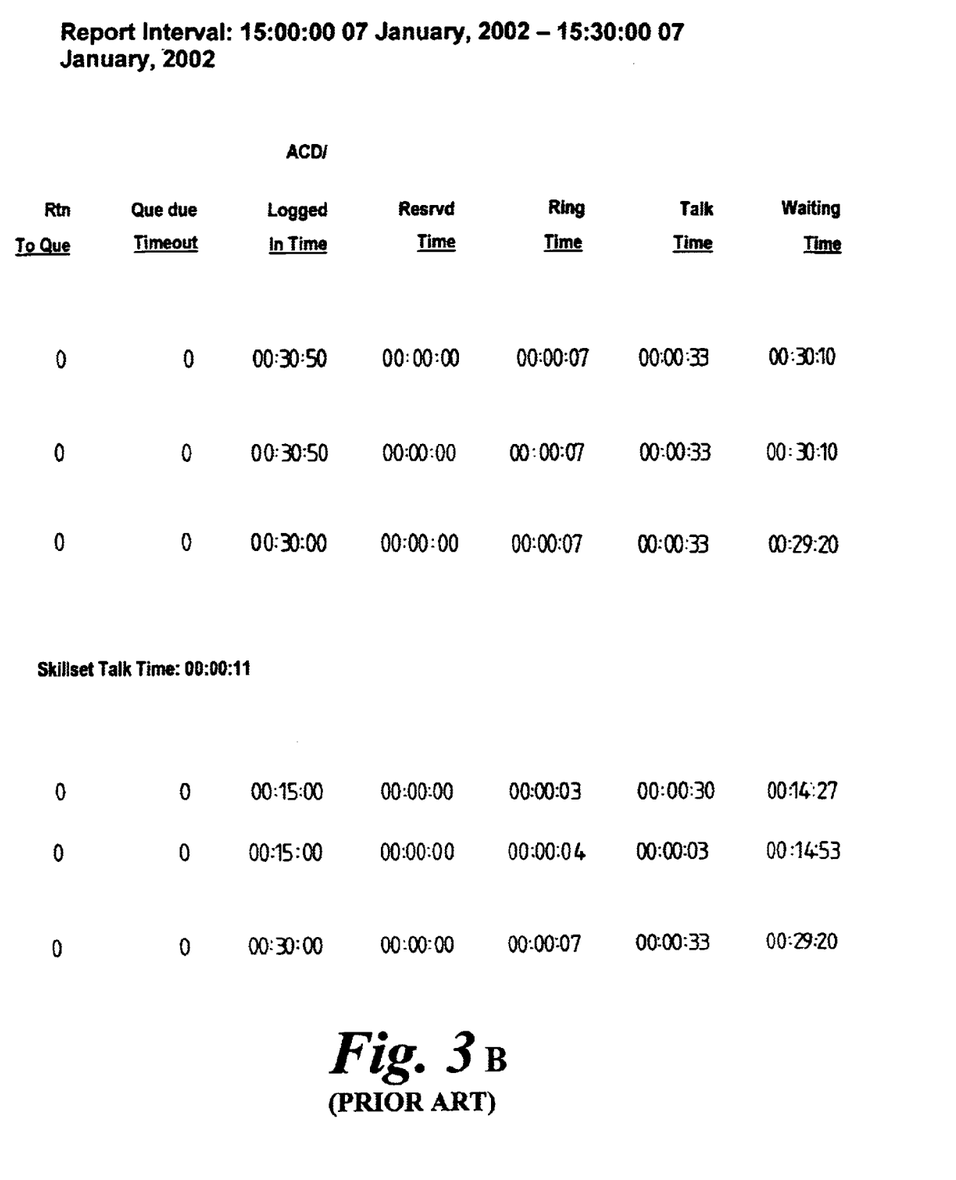
Figure 3C:
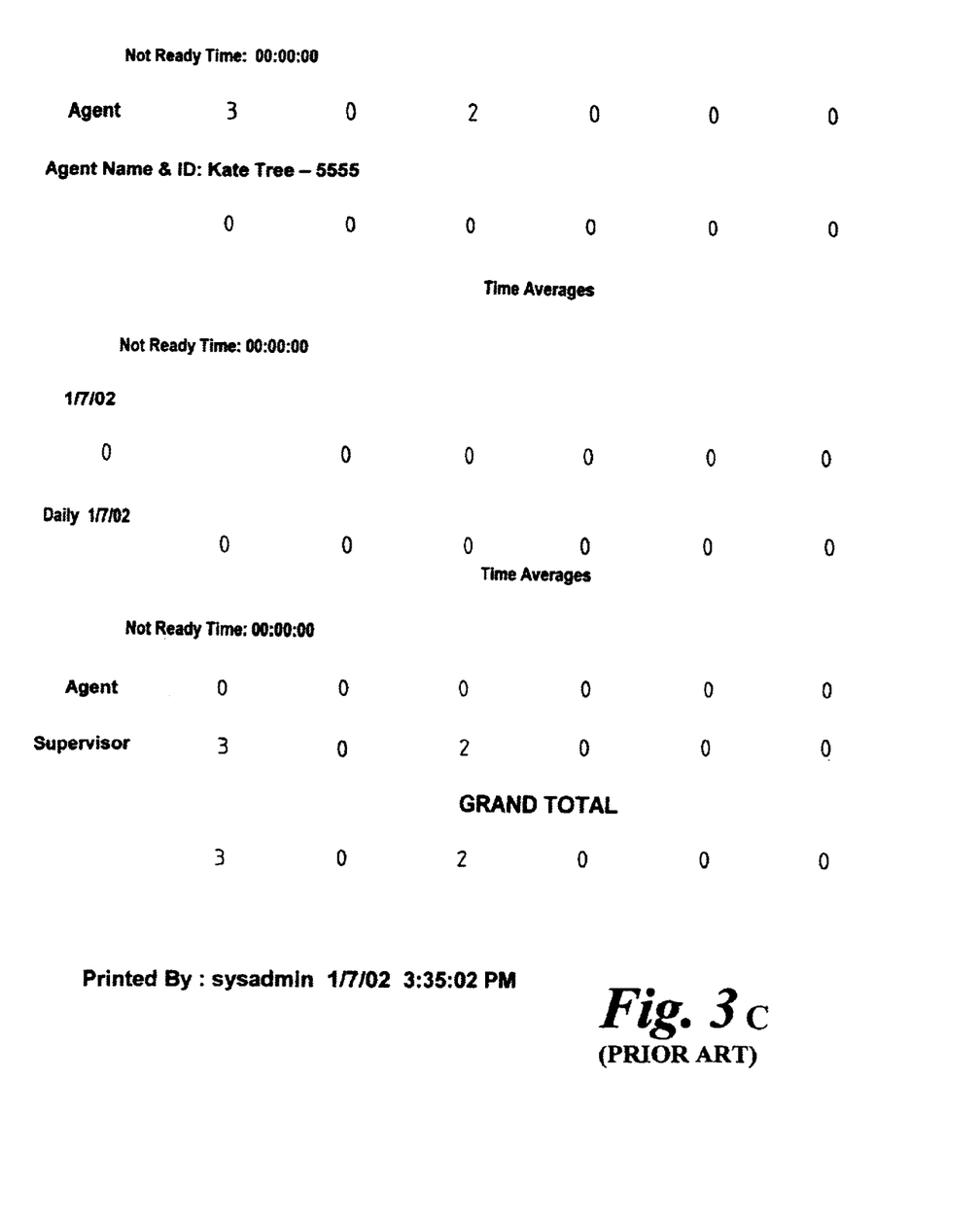
Figure 3D:
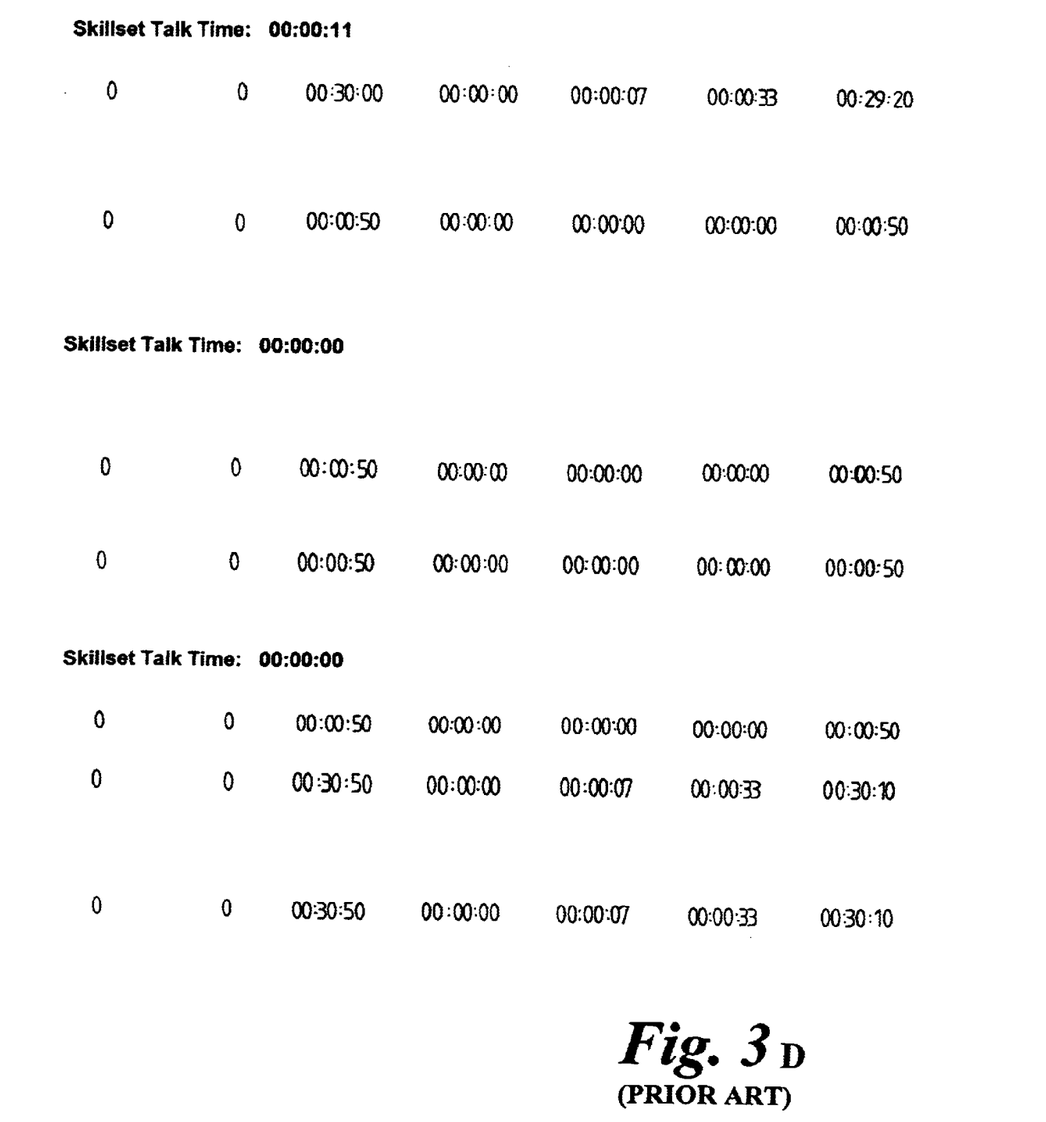

FIG. 2 is a schematic diagram of the call center server 16 of FIG. 1. It shows that the call center comprises a management system 24 as mentioned above and this is provided by a call server. In addition, the call center server 16 has access to, or comprises, a call-by-call database 26 as known in the art. This database, also known as an event database, stores raw information about events occurring in the call center. For example, arrival of an incoming call, routing of a call to a particular agent, routing of a call to a particular queue.

The call center server 16 also has access to, or comprises, an historical statistics database as known in the art. This stores aggregate information about the behaviour of the call center. For example, the number of calls answered by a particular agent during a specified time interval.

The present invention also ensures that a statistics regenerator 29 is incorporated in the call center server 16 or alternatively that the call center server 16 has access to a statistics regenerator 29. The function and manner in which this statistics regenerator 29 is used is described in detail below.

Figure 4:
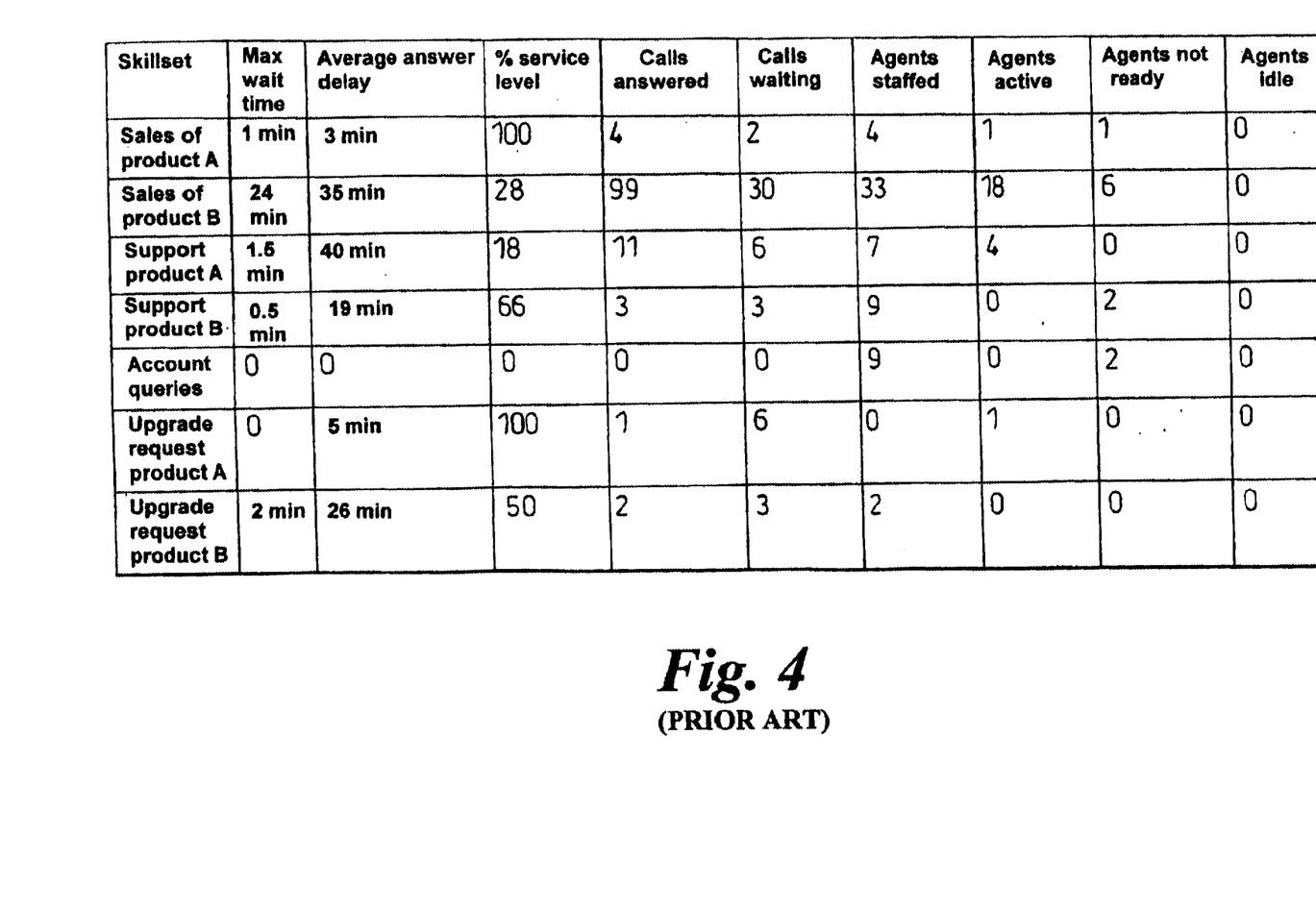
FIG. 4 is an example of a realtime statistics display according to the prior art.

Previously, call centers have been arranged to provide both historical reports and current data to supervisors. FIG. 4 is an example of current data available to supervisors and FIG. 3 is an example of an historical report.

The table of FIG. 4 lists seven different skillsets in the left most column. As mentioned above a skillset is a prespecified list of knowledge or abilities that agents are required to have in order to service calls related to that skillset. For example, FIG. 4 gives "sales of product A" as the name for the skillset in the first row of the table. Agents operating in this skillset are able to service sales calls about product A. Associated with each skillset is a queue of calls (which may be empty) requiring service by an agent with the particular knowledge and abilities of that skillset.

The remaining columns in the table each contain values of a parameter such as maximum waiting time or number of calls answered. Some of these parameters reflect the situation at a current time instant whereas others are determined over a specified time interval. For example, maximum waiting time gives the longest length of time that any call in the current queue for the particular skillset has been waiting. This parameter value is thus determined over a time interval. Another parameter however, such as number of agents active, reflects the situation at a current time instant. That is, how many agents are actively handling calls at a particular time instant for the skillset concerned.

As known in the art, the call center server comprises a pegging engine which comprises counter systems for keeping tallies of for example, the number of calls answered for each skillset since the beginning of the working day. A pegging engine is an apparatus responsible for the production of realtime and historical contact center statistics based on information received from call processing and resource management components. This pegging engine provides the output for the parameter values in the current data display of FIG. 4, in this way current information or "real-time statistics" about performance of the call center is made available to supervisors. The information is communicated to a supervisor terminal 22 and is displayed there.

FIG. 3 shows an historical report as previously available to supervisors. The data in this report concerns behaviour of the call center during a specified time interval, in this case half an hour between 3 pm and 3.30 pm on 7 Jan. 2002. Thus this differs from the information in FIG. 4 which is about the current situation only.

FIG. 3 gives information about a particular supervisor, Joe Bloggs and two agents for whom he is responsible, Jane Book and Kate Tree. Parameters values such as averages and totals over the time interval of the report are given for each agent. This type of report enables the supervisor to assess performance of the agents.

The information used to form historical reports such as that shown in FIG. 3 is obtained from the historical statistics database 28 accessible by the call center server.

As mentioned above, the information previously available to supervisors is limited in that it is not simple to obtain information about what the parameter values in the table of FIG. 4 were at a particular time instant in the past. For example, in the situation that a supervisor received a customer complaint about a particular time in the past, the supervisor is not easily able to find out what the maximum waiting time was at that instant. The historical report (e.g. FIG. 4) only provides information about what the waiting time was during a thirty minute (or other) time interval and not at a particular time instant.

As mentioned above, call centers typically comprise a call-by-call database or event database which stores raw information about events in the call center. These events are things like arrival of an incoming call or routing of a call to a particular skillset queue. Typically this type of database stores information only for a specified time such as two weeks or a month. Otherwise the volumes of data become prohibitive.

However, even given the information in the event database and the information in the historical statistics database it has not previously been possible to provide the current information of the type shown in FIG. 4 for a particular time instant in the past.

The present invention addresses this problem by using the statistics regenerator mentioned above and also by adapting the call center server in order that it generates "real time snapshots" for storage either in the historical statistics database or in any other suitable database. The statistics regenerator comprises a pegging engine similar to that of the call center server and takes as input information from the events database and "real time snapshots" from the historical statistics database. In order to generate current information of the type shown in FIG. 4 for a particular time instant in the past, the statistics regenerator obtains the "real time snapshot" closest in time but previous to the required particular time instant. It then inputs information from the events database for the time period between the obtained "real time snapshot" and the required particular time instant. The pegging engine is initialised with the information from the obtained "real time snapshot" and then arranged to process the obtained event data. The output of the pegging engine then provides the required information which is "current" information of the type shown in FIG. 4 for the particular time instant in the past. Preferably, a supervisor is able to simply use a scroll or other mechanism on a display such as that of FIG. 4 in order to view historical data of the same form.

Figure 5:
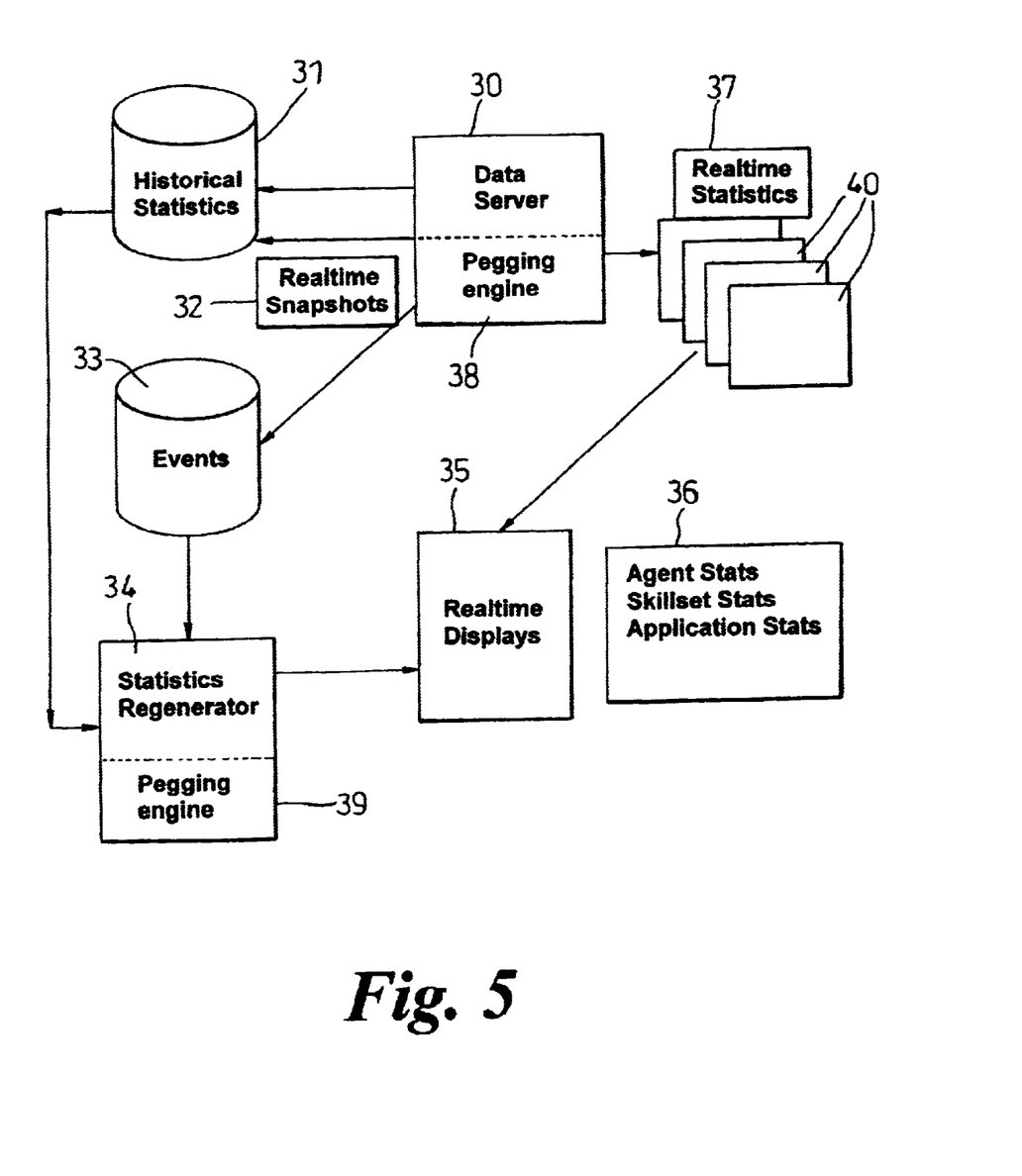
FIG. 5 is a schematic diagram of components of the call center of FIG. 1 in more detail'

This is explained in more detail with reference to FIG. 5. This shows schematically components of a call center arranged to carry out the present invention as well as a real time display for a supervisor terminal 22.

The call center comprises a data server 30 with a pegging engine 38. As known in the art the data server is arranged to use the parallel pegging engine to generate both current and historical statistics as mentioned above. The historical statistics are stored in a historical statistics database 31 which can be integral with the call center or may be separate but accessible. The current statistics 37 (also referred to as realtime statistics) are output to memory tables in the call center server. This information is then communicated to graphical user interfaces or other displays at supervisor terminals as required. For example, a supervisor terminal 22 comprises a realtime display 35 for use by a supervisor and which displays information 36 from the memory tables. This information comprises for example, statistics about agents, statistics about skillset queues and statistics about applications as known in the art.

As known in the art, the data server 30 is also arranged to output event data to an event database 33 as mentioned above. This is illustrated in FIG. 5. The information in the event database is used for example to track a particular call that occurred in the past. This is useful in the event of a query or complaint about a particular call or for debugging purposes.

However, the information in the event database is raw and low level and does not provide a supervisor with information about for example, the maximum waiting time at a particular past time instant.

The present invention involves adapting the data server 30 such that it outputs "realtime snapshots" 32 for storage in the historical statistics database 31 or any other suitable database. A "realtime snapshot" comprises statistics about the behaviour of the call center at a particular time instant. This comprises, for the particular time instant, current parameter values such as the number of active agents in a particular skillset as well as current values of aggregate parameters such as the total number of calls received for a particular skillset since the start of the working day in which the particular time instant occurs. This differs from the historical statistics stored in the historical statistics database 31 which are aggregate values over a specified time interval.

In a preferred example the realtime snapshots comprise the same information as output to the realtime displays 35 on the supervisor terminals. Thus in this case, a copy of the information output to the realtime displays 35 is simply made every 30 or 15 minutes or so and stored in the historical statistics database 31.

A statistics regenerator 34 is also provided as mentioned above. This component can be integral with the call center server but this is not essential. The statistics regenerator 34 is arranged to accept inputs comprising realtime snapshots 32 from the database at which those are stored, as well as the event information from the event database 33 as illustrated in FIG. 5. The statistics regenerator produces statistics of the same type as those in the realtime statistics 37 but relevant to a particular past time instant rather than the current time. This output is provided to the realtime display 35 of a supervisor terminal. Preferably, the form and type of the output from the statistics regenerator 34 is such that the format of the display on the supervisor terminal is maintained no matter whether current statistics 37 are displayed or past statistics from the statistics regenerator 34. This provides the advantage that a supervisor is quickly and easily able to view information about past performance of the call center in a format that is familiar to him or her.

Operation of the statistics regenerator is now described with reference to FIG. 6.

The statistics regenerator first receives a request for statistics relevant to a required past time instant (see box 60). This request may come directly from a supervisor terminal, or may be received from a supervisor terminal via the call center server.

The statistics regenerator then obtains the most relevant realtime snapshot from the database where the realtime snapshots are stored (see box 61). The most relevant realtime snapshot is the snapshot closest in time to the required past time instant. Preferably the most relevant snapshot must also be for a time prior to the required time instant although this is not essential.

Figure 6:
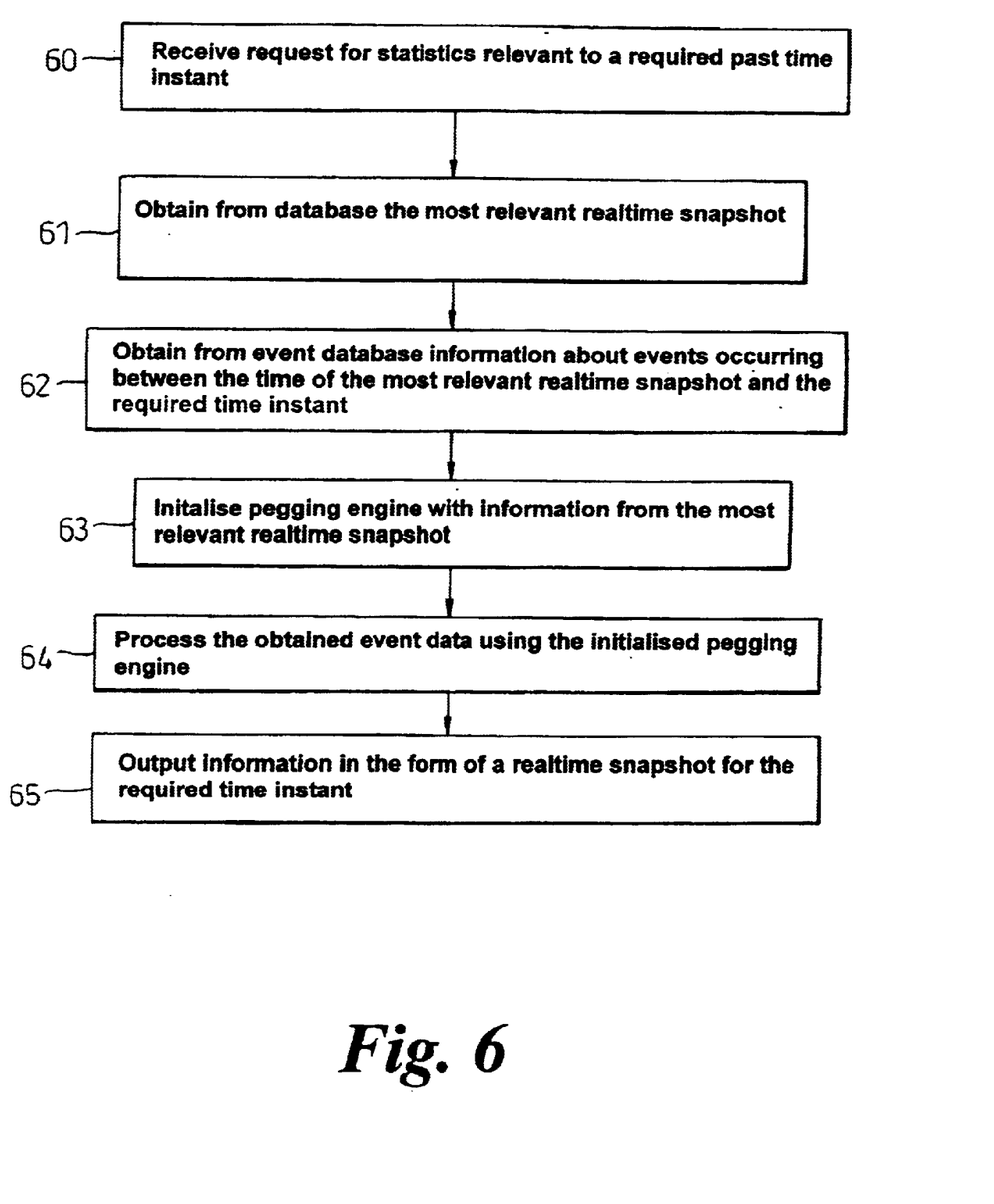
FIG. 6 is a flow diagram of a method of operation of a statistics regenerator according to an embodiment of the invention.

The statistics regenerator then obtains from the event database information about events occurring between the time of the most relevant realtime snapshot and the required time instant (see box 62 of FIG. 6). Next or in the meantime, the pegging engine of the statistics regenerator is initialised with information from the most relevant realtime snapshot (see box 63 of FIG. 6).

The initialised pegging engine is then used to process the event data obtained from the event database (see box 64 of FIG. 6). This gives an output comprising information for a realtime snapshot associated with the required past time instant (box 65). In the case that the realtime snapshot used for initialising the pegging engine is prior in time to the required time instant then the pegging engine simply operates in the same manner as the conventional pegging engine of the call center server. In this case it is possible for only one pegging engine to be provided, that of the call center, and the statistics regenerator makes use of that pegging engine. In the case that the realtime snapshot used for initialising the pegging engine is after the required time instant then the pegging engine effectively needs to operate in reverse. This is more complex than the alternative option described above but can provide a workable solution if required. This is because pegging engines are designed to process events in a forward chronological order. Processing events in the reverse order is possible given redesign of the algorithms designed to produce statistics from the event information.

This provides the advantage that it is only necessary to store realtime snapshots at some times, for example, every 30 minutes. (This advantage is achieved no matter whether events are processed in the forward or reverse directions.) By using the event data to update those realtime snapshots it is possible to obtain a realtime snapshot for any particular past time without needing to store realtime snapshots for all past time instances. Also, by careful selection of the frequency of storage of the realtime snapshots a good balance between resources needed to store those snapshots and resources needed to process event information and update those snapshots to find the situation for a particular past time can be found. Thus the particular frequency of storage of the realtime snapshots is chosen depending on a number of factors such as the number of statistics present in a realtime snapshot, and the complexity of calculating those statistics.

What is claimed is:

1. A method of determining statistics about the behaviour of a call center at a required past time instant said method comprising the steps of:
   (i) storing sets of values of statistics about the behaviour of the call center at a plurality of time intervals, each set of values being associated with a particular time instant;
   (ii) accessing information about past events occurring in the call center from an event database;
   (iii) accessing from said stored sets of values, a first set of values whose associated time instant is a known time from said required past time instant;
   (iv) extrapolating from said first set of values to an output set of values whose associated time instant is the required time instant, by using information accessed from the event database.

2. A method as claimed in claim 1 wherein said first set of values is selected such that its associated time instant is as close as possible in time to said required past time instant.

3. A method as claimed in claim 1 wherein said step (iv) of extrapolating comprises:
   initialising a pegging engine using said accessed set of values;
   accessing from the event database information about events occurring between the time instant associated with the first set of values and the required time instant;
   processing the accessed information about events using the initialised pegging engine in order to produce an output set of values of statistics whose associated time instant is the required time instant.

4. A method as claimed in claim 1 which further comprises sending said output set of values to a supervisor terminal associated with the call center for display to a supervisor.

5. A method as claimed in claim 4 wherein said output set of values are for the same statistics as also displayed to a supervisor about the current behaviour of the call center.

6. A method as claimed in claim 1 wherein said first set of values is associated with a time instant prior to the required time instant.

7. A method as claimed in claim 1 wherein said first set of values is associated with a time instant after the required time instant.

8. An apparatus for determining statistics about the behaviour of a call center at a required past time instant said apparatus comprising:
  (i) a storage device arranged to store sets of values of statistics about the behaviour of the call center at a plurality of time intervals, each set of values being associated with a particular time instant;
  (ii) a first input arranged to access information about past events occurring in the call center from an event database;
  (iii) a second input arranged to access from said stored sets of values, a first set of values whose associated time instant is a known time from said required past time instant; and
  (iv) a processor arranged to extrapolate from said first set of values to an output set of values whose associated time instant is the required time instant, by using information accessed from the event database.

9. An apparatus as claimed in claim 8 wherein said processor comprises a pegging engine.

10. An apparatus as claimed in claim 9 wherein said pegging engine is arranged to be initialised with said first set of values and to carry out said extrapolation by processing information about events occurring between the time instant associated with the first set of values and the required time instant.

11. A call center comprising an apparatus as claimed in claim 8.

12. A computer program arranged to control a call center in order to carry out the method of claim 1.

13. A statistics regenerator for use in a call center said statistics regenerator comprising:
  (i) a first input arranged to access stored sets of values of statistics about the behaviour of the call center each set of values being about behaviour of the call center at a past time instant;
  (ii) a second input arranged to access information about past events occurring in the call center from an event database;
  (iii) a processor arranged to use the first input to access a first set of values about behaviour of the call center at a past time instant a known time from said required past time instant;
  (iv) a pegging engine arranged to extrapolate from said first set of values to an output set of values whose associated time instant is the required time instant, by using information accessed from the event database.

14. A statistics regenerator as claimed in claim 13 wherein said pegging engine is further arranged to be initialised with said first set of values and to process information about events occurring between a time instant associated with the first set of values and the required lime instant in order to produce the output set of values.

15. A statistics regenerator as claimed in claim 13 wherein the time instant associated with the first set of values is prior to the required time instant.

16. A statistics regenerator as claimed in claim 13 wherein the time instant associated with the first set of values is after the required time instant.

* * * * *